United States Patent
Yanase et al.

(10) Patent No.: US 7,601,905 B2
(45) Date of Patent: Oct. 13, 2009

(54) ELECTRONIC MUSICAL APPARATUS FOR REPRODUCING RECEIVED MUSIC CONTENT

(75) Inventors: Tsutomu Yanase, Hamamatsu (JP); Tomoyuki Kageyama, Meguro-ku (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 12/131,260

(22) Filed: Jun. 2, 2008

(65) Prior Publication Data

US 2008/0229909 A1 Sep. 25, 2008

Related U.S. Application Data

(62) Division of application No. 11/195,062, filed on Aug. 2, 2005.

(30) Foreign Application Priority Data

Aug. 4, 2004 (JP) ............................. 2004-227803
Aug. 4, 2004 (JP) ............................. 2004-227807

(51) Int. Cl.
G10H 1/00 (2006.01)
G10H 7/00 (2006.01)
(52) U.S. Cl. .......................................... 84/600; 726/26
(58) Field of Classification Search ................... 84/600; 726/26
See application file for complete search history.

(56) References Cited

U.S. PATENT DOCUMENTS 6,515,211 B2 * 2/2003 Umezawa et al. ......... 84/477 R
6,570,080 B1 5/2003 Hasegawa et al.

(Continued)

FOREIGN PATENT DOCUMENTS

EP 1 403 847 A2 3/2004

(Continued)

OTHER PUBLICATIONS

Relevant portion of Search Report issued in European Patent Application No. EP 04 10 6950, mailing date of Oct. 25, 2005, which corresponds to related co-pending U.S. Appl. No. 11/019,086.

(Continued)

*Primary Examiner*—Jeffrey Donels
(74) *Attorney, Agent, or Firm*—Rossi, Kimms & McDowell LLP (57) ABSTRACT

A browser portion BR obtains a reproduction manner specifying file from a content distribution server 30, and delivers the same to a reproduction control portion CT. The reproduction control portion CT obtains from the content distribution server 30 a music content file designated by a reproduction content list in the reproduction manner specifying file. The reproduction control portion CT reproduces, in cooperation with a tone generating circuit 43, a music piece corresponding to the music content in a reproduction manner specified by the reproduction manner specifying file. The reproduction control portion CT displays the music content on a display device 42 in a display manner specified by a reproduction manner specifying file. When a user operates an input operation element group 41 for changing the display manner of the display device 42, the reproduction control portion CT changes the display manner of the display device 42. Stream-distributed music content is prohibited from being stored in recording medium (a non-volatile memory) 65a and from being outputted to the outside through output interface 67.

7 Claims, 7 Drawing Sheets

U.S. PATENT DOCUMENTS

| | | | |
|---|---|---|---|
| 6,660,922 B1 * | 12/2003 | Roeder | 84/477 R |
| 6,671,807 B1 | 12/2003 | Jaisimha et al. | |
| 7,019,204 B2 * | 3/2006 | Terada | 84/601 |
| 7,032,819 B2 * | 4/2006 | Iida et al. | 235/381 |
| 7,069,274 B2 | 6/2006 | Stern | |
| 7,113,983 B1 * | 9/2006 | Terada et al. | 709/219 |
| 7,159,174 B2 | 1/2007 | Johnson et al. | |
| 7,206,821 B2 | 4/2007 | Moritomo | |
| 7,209,900 B2 | 4/2007 | Hunter et al. | |
| 7,216,178 B2 | 5/2007 | Juszkiewicz | |
| 7,254,414 B2 | 8/2007 | Nakamura et al. | |
| 7,277,928 B2 | 10/2007 | Lennon | |
| 7,281,034 B1 | 10/2007 | Eyal | |
| 7,356,557 B2 * | 4/2008 | Kikuchi et al. | 709/201 |
| 7,371,956 B2 * | 5/2008 | Tohgi et al. | 84/600 |
| 2002/0065880 A1 * | 5/2002 | Hasegawa et al. | 709/203 |
| 2002/0103759 A1 * | 8/2002 | Matsumoto et al. | 705/51 |
| 2002/0165921 A1 * | 11/2002 | Sapieyevski | 709/204 |
| 2003/0029304 A1 | 2/2003 | Ochi | |
| 2003/0200316 A1 | 10/2003 | Isozaki et al. | |
| 2004/0139845 A1 * | 7/2004 | Tohgi et al. | 84/600 |
| 2005/0150358 A1 * | 7/2005 | Yanase et al. | 84/600 |
| 2005/0188823 A1 * | 9/2005 | Okamoto | 84/645 |
| 2005/0195695 A1 * | 9/2005 | Yanase et al. | 369/30.06 |
| 2006/0027077 A1 * | 2/2006 | Ikeda et al. | 84/600 |
| 2006/0031548 A1 * | 2/2006 | Funchess | 709/231 |
| 2006/0054008 A1 * | 3/2006 | Yanase et al. | 84/622 |
| 2007/0012164 A1 * | 1/2007 | Morley et al. | 84/609 |

FOREIGN PATENT DOCUMENTS

| | | |
|---|---|---|
| JP | 2001-42866 A | 2/2001 |
| JP | 2002-335507 A | 11/2002 |
| JP | 2002-369174 A | 12/2002 |
| JP | 2003-114690 A | 4/2003 |
| JP | 2003-308237 A | 10/2003 |
| JP | 2004-078298 A | 3/2004 |
| WO | 03/096340 A2 | 11/2003 |

OTHER PUBLICATIONS

Anonymous; "The HFA website provides answers to commonly asked questions about mechanical licensing and other related inquiries"; HFA, Online! XP002348047; Retrieved from the internet: URL:http://www.harryfox.com/public/infoFAQDefinitions.jsp>.

Buechner; "Too Legit For those who want to stay within the laws, the variety on download sites is getting better all the time"; Internet Article, 'Online! Apr. 7, 2003; XP002348046; Retrieved from the Internet:URL:http://www.time.com/time/techtime/200304/sites_angel.html>'retrieved on Oct. 6, 2005!

English translation of an office action issued in Japanese application No. 2003-432350, mailed Dec. 4, 2007, which corresponds to related co-pending U.S. Appl. No. 11/019,086.

Relevant portion of extended European Search Report dated Apr. 10, 2006 of corresponding European Application EP 05 10 7121.

Kozamernik, Frank; "Streaming Media over the Internet? An Overview of Delivery Technologies"; EBU Technical Review; [Online] Oct. 2002; Retrieved from the Internet: http://www.ebu.ch/en/technical/trev/trev_292-kozamernik.pdf.

Lowry, Michael A.; "Hacker's Guide to Quick Time"; [Online] Mar. 1, 2004; Retrieved from the Internet:http://web.archive.org/web/20040301042747/http://home.sol.se/michael/qtguide/.

Anonymous; "How to Protect Streaming Video/Audio from Recording?"; [Online] Jun. 18, 2004; Retrieved from the Internet:http://web.archive.org/web/20040618041518/http://www.all-streaming-media.com/streaming-media-faq/faq-protect-streaming-video.htm.

Relevant portion of partial European Search Report dated Jan. 30, 2006 of corresponding European Application EP 05 10 7121.

Nilsson, M.; "ID3 Tag version 2.4.0—Native Frames"; Nov. 1, 2000; retrieved from the Internet on Nov. 24, 2005.

Microsoft Corp.; "Windows Media Player 9 Series Help File"; Jun. 7, 2003; XP002356255. Online at: http://web.archive.org/web/20030607004710/microsoft.com/windows/windowsmedia/9series/player/helpdocs.aspx; Retrieved on Nov. 24, 2005; pp. 1-14, 30-33, 70-77, 89-90 and 158.

Yamaha Corp.; "Digital Music Notebook Help Version 1.02"; CD-ROM 2003, XP002356256. Retrieved on Apr. 6, 2005.

Office Action dated Mar. 18, 2009, issued in Japanese Application No. 2004-227803, which corresponds to related co-pending U.S. Appl. No. 11/195,062. Partial English translation provided.

Decision of Refusal issued in corresponding Japanese Patent Appln. No. 2004-227803 dated Jun. 9, 2009.

* cited by examiner

```
Karaoke
Lesson
BGM
  .
  .
  .
```

(B)

```
Music piece for piano
    System-selected reproduction
    Genre designation
Music piece for guitar
    System-selected reproduction
    Genre designation
```

(C)

```
Music piece for piano
Genre designation
Jazz
Rock
Folk
   .
   .
```

(D)

```
Karaoke
Title      x x x
Composer   x x x
Artist     x x x
```

(E)

```
Title    x x x
Lyrics   x x x x x x
         x x x x x x
         x x x x x x
         x x x x x x
```

(F)

```
Lesson music
Title      x x x
Composer   x x x
Artist     x x x
```

(G)

ELECTRONIC MUSICAL APPARATUS FOR REPRODUCING RECEIVED MUSIC CONTENT

This is a divisional of U.S. patent application Ser. No. 11/195,062 filed Aug. 2, 2005, which is based on and claims priority to Japanese Patent Application 2004-227803 filed on Aug. 4, 2004, and Japanese Patent Application 2004-227807 filed on Aug. 4, 2004. The disclosure of the priority applications in their entirety, including the drawings, claims, and the specification thereof, is incorporated herein by reference.

BACKGROUND OF THE INVENTION

1. Field of the Invention

The present invention relates to an electronic musical apparatus that reproduces a music content received from a content distribution server, and to a computer program applied to this apparatus.

2. Description of the Related Art

It has conventionally been well-known that an electronic musical apparatus, that is a client terminal, requests a music content to a content distribution server, and receives to reproduce the music content transmitted from the content distribution server. In particular, Japanese Unexamined Patent Application No. 2003-114690 discloses a music content distribution system for karaoke. In this music content distribution system, a lyric flag is attached in a music content, wherein lyrics are displayed on an electronic musical apparatus when the lyric flag is "1", while lyrics are not displayed on an electronic musical apparatus when the lyric flag is "0". This allows the control for providing lyrics together with music to a registered user and for providing only music to a non-registered user.

However, in the aforesaid conventional apparatus, lyrics are always displayed on a display screen of an electronic musical apparatus for a registered user, so that the user cannot freely change the display manner of the display screen even if he/she desires a display screen other than lyrics.

It has conventionally been well-known that an electronic musical apparatus, that is a client terminal, requests a music content to a content distribution server, and receives to reproduce the music content stream-distributed from the content distribution server, as shown in Japanese Unexamined Patent Application No. 2002-335507.

A stream distribution has an advantage for a user in a copyright fee. However, if the music content that is distributed by using a recording function provided at the electronic musical apparatus can be stored in a non-volatile memory, this distribution cannot be treated as a stream distribution. Similarly, if the music content that is distributed from an MIDI output or digital audio output provided at the electronic musical apparatus can be outputted to an external device, there is a fear that this music content is recorded on the external device. Therefore, it cannot be treated as a stream distribution in this case. The aforesaid conventional apparatus does not consider the stream distribution.

SUMMARY OF THE INVENTION

The present invention is accomplished in view of the aforesaid problems, and aims to provide an electronic musical apparatus capable of freely selecting a display screen by a user, and a computer program applied to the same apparatus.

Further, another object of the present invention is to provide an electronic musical apparatus that considers the copyright with respect to a stream-distributed music content, and a computer program applied to the same apparatus.

In order to accomplish the above-mentioned objects, the present invention is characterized by being provided with a receiving portion that receives a music content and specifying data for specifying a display manner of the music content from a distribution server; a reproducing portion that reproduces a music piece corresponding to the received music content; a display control portion that, during the reproduction of the music piece, displays on a display device the received music content with a display manner that is specified by the received specifying data; and a changing portion that changes the display manner of the display device into a display manner different from the display manner specified by the received specifying data. In this case, the music content may be, for example, music data indicating a music piece, lyric data indicating lyrics, score data indicating a score, or the like. Lyrics or score may be displayed on the display device.

In the present invention having the aforesaid configuration, the display manner of the display device can be changed into a display manner that is different from the display manner specified by the received specifying data, whereby a user can reproduce the music content as seeing the desired display screen.

Another feature of the present invention is that an electronic musical apparatus is provided with a receiving portion that receives a music content from a content distribution server; a reproducing portion that reproduces the received music content; and a storage prohibiting portion that prohibits the obtained music content from being stored in a non-volatile memory, in case where the obtained music content is stream-distributed from the content distribution server. In this case, the music content distributed by a download may be allowed to be stored in a non-volatile memory. Further, the music content may be, for example, music data indicating a music piece, lyric data indicating lyrics, score data indicating a score, or the like.

According to this, in case where a music content is distributed from a content distribution server by a stream distribution, the music content is prohibited from being stored in a non-volatile memory. Therefore, there arises no problem even if the stream distribution of the music content is maintained, so that the stream distribution can be maintained.

Still another feature of the present invention is that an electronic musical apparatus is provided with an external output prohibiting portion that prohibits an output of the obtained music content to the outside, in case where the obtained music content is stream-distributed from the content distribution server. In this case, the music content distributed by a download may be allowed to be externally outputted. Further, the music content may be, for example, music data indicating a music piece, lyric data indicating lyrics, score data indicating a score, or the like.

According to this, in case where a music content is distributed from a content distribution server by a stream distribution, the output of the music content to the outside is prohibited. Therefore, the music content is prevented from being recorded on an external device, so that the stream distribution can be maintained.

The present invention not only can be configured and embodied as a device invention, but also can be configured and embodied as a computer program.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
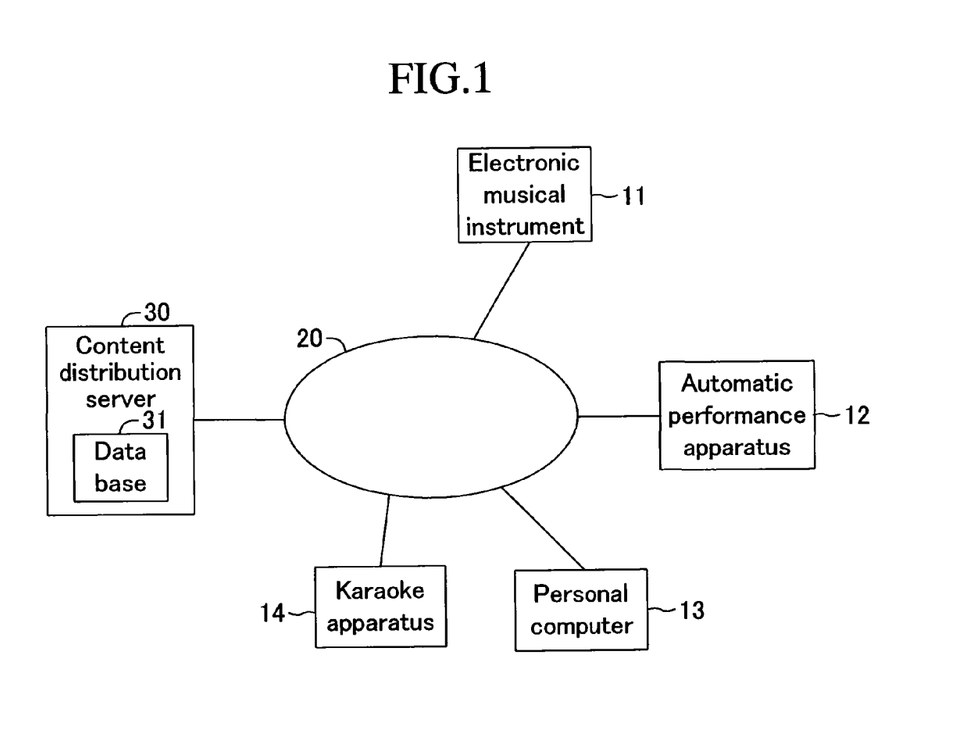
FIG. 1 is a schematic view of a network system including an electronic musical apparatus according to one embodiment of the present invention.

One embodiment of the present invention will be explained with reference to drawings. FIG. 1 schematically shows a music content distribution system including an electronic musical apparatus according to the present invention. The electronic musical apparatus is a generic term indicating, for example, an electronic musical apparatus 11, automatic performance apparatus 12, personal computer 13, karaoke apparatus 14 or the like. These electronic musical apparatus 11, automatic performance apparatus 12, personal computer 13, karaoke apparatus 14 or the like are connected to a network 20 such as the Internet, public telephone line, dedicated line, LAN or the like. A content distribution server 30 is connected to this network 20. The content distribution server 30 has a data base 31 and configured by a computer apparatus executing a content distribution program shown in FIG. 4.

Figure 3:
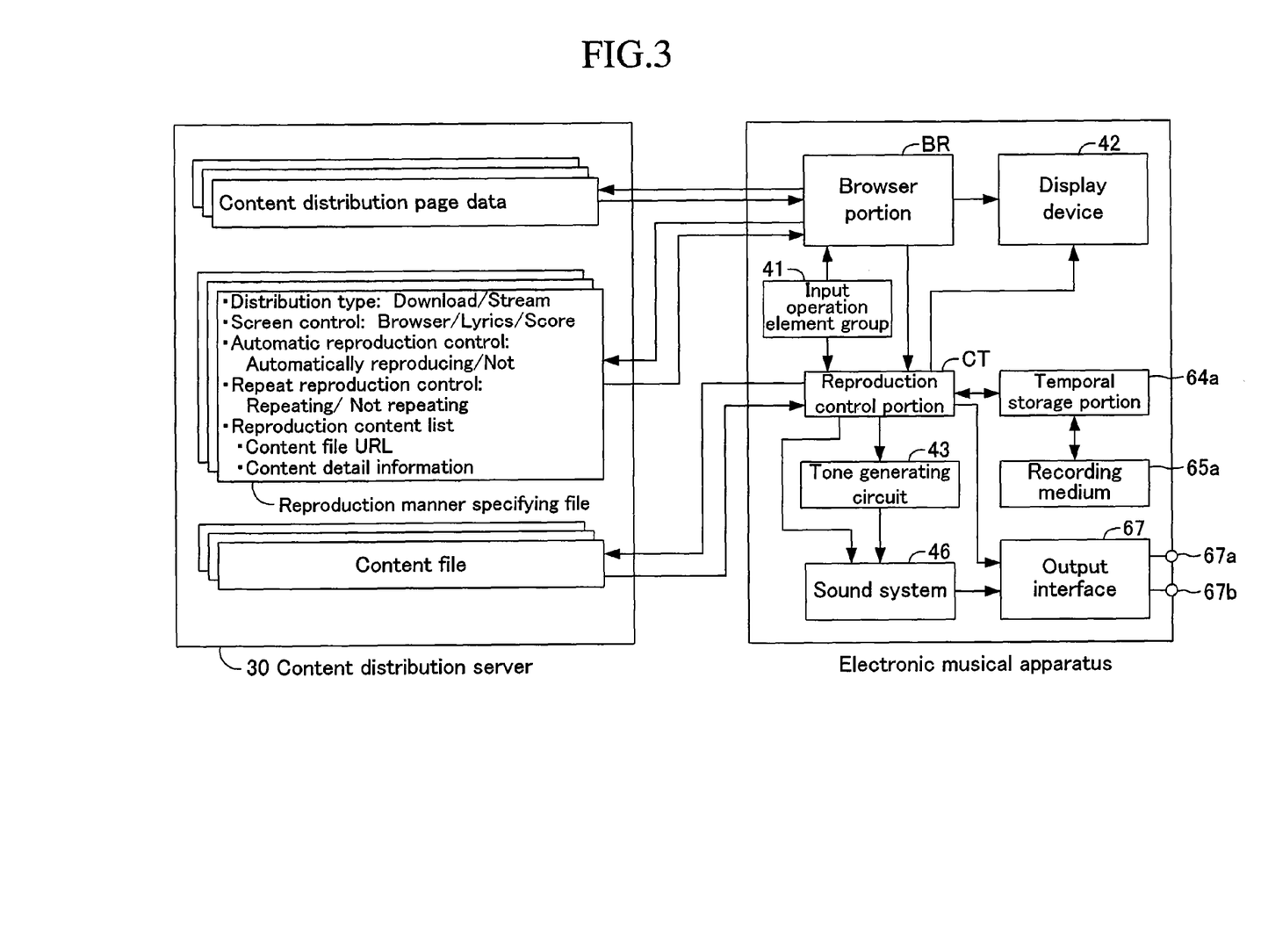
FIG. 3 is a functional block diagram of a content distribution server and the electronic musical apparatus.

The data base 31 stores plural pieces of content distribution page data, plural reproduction manner specifying files and plural content files as shown in FIG. 3. Each piece of content distribution page data indicates a display screen (see FIGS. 7(A) to (C)) for obtaining a content by a later-described browser portion BR of the electronic musical apparatus. Each of the reproduction manner specifying files specifies a later-described reproduction manner of a music content as designated by a link provided on the display screen, and has distribution type data, screen control data, automatic reproduction control data, repeat reproduction control data, reproduction content list data or the like. Each of the content files stores music data indicating a music piece, lyric data indicating lyrics, score data indicating a score (or note data indicating a series of notes) or the like.

The distribution type data indicates whether the distribution type of the music content is a download type or stream type. The download type means a distribution type wherein an edition and storage by a user are allowed. The stream type means a distribution type wherein an edition and storage by a user are prohibited, and is a distribution type of a music content that is only utilized by an electronic musical apparatus of a user. The screen control data indicates any one of screens, which should be displayed, of a browser screen, lyric screen and score screen. The automatic reproduction control data indicates whether the distributed music content is automatically reproduced or not. The repeat reproduction control data indicates whether plural music contents are repeatedly reproduced or not. The reproduction content list data is composed of a pair of or a plurality of content URLs and content detail information. The content URL specifies a content file. The content detail information indicates a title, composer, artist, copyright information, or the like of the music content.

Figure 2:
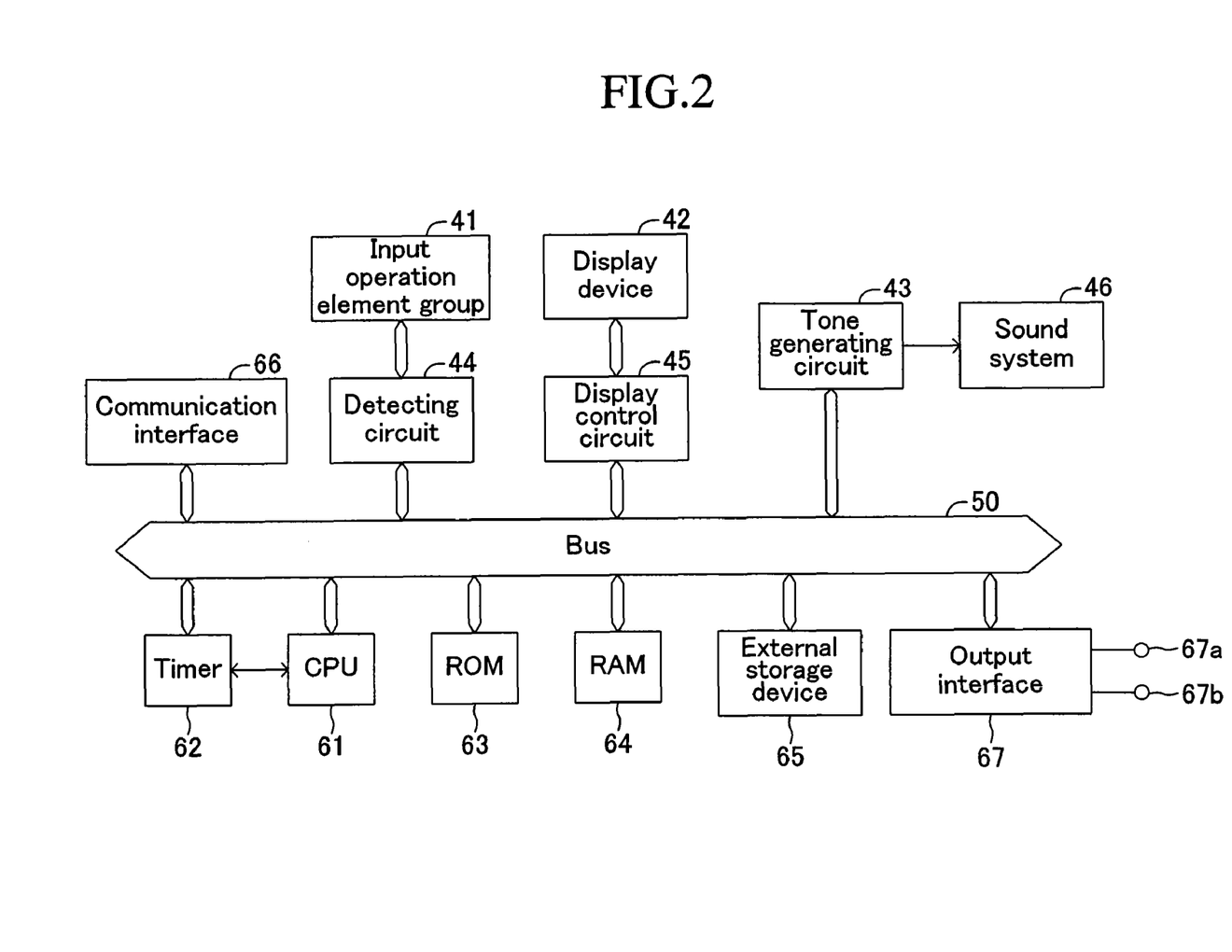
FIG. 2 is an entire block diagram of the electronic musical apparatus.

On the other hand, the electronic musical apparatus (electronic musical instrument 11, automatic performance apparatus 12, personal computer 13, karaoke apparatus 14, or the like) has an input operation element group 41, display device 42 and tone generating circuit 43 as shown in FIG. 2. The input operation element group 41 is composed of plural operation elements for instructing the operation of this electronic musical apparatus. The operations of these plural operation elements are detected by a detecting circuit 44 connected to a bus 50. These plural operation elements include a switch operation element, volume operation element, mouse or the like. In a keyboard-type electronic musical instrument, they also include white keys and black keys. The display device 42 is composed of a liquid crystal display or CRT, and displays characters, numbers, diagrams, or the like. The display manner of this display device 42 is controlled by a display control circuit 45 connected to the bus 50. The tone generating circuit 43, which is connected to the bus 50, generates a tone signal based upon performance data that is supplied under a control of a later-described CPU 61, gives a musical effect to the generated tone signal and outputs the resultant to a sound system 46. The sound system 46 includes speakers, amplifiers or the like, and sounds out a tone corresponding to the tone signal from the tone generating circuit 43.

Figure 4:
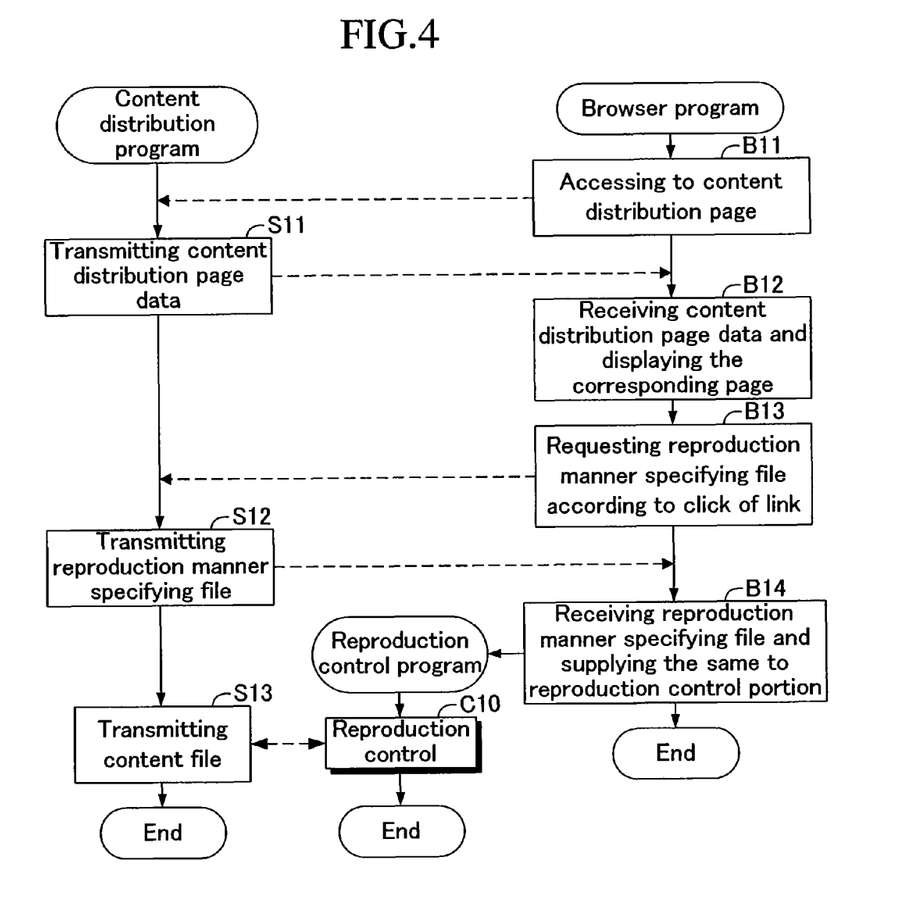
FIG. 4 is a flowchart showing a content distribution program, browser program and reproduction control program.

This electronic musical apparatus is further provided with a CPU 61, timer 62, ROM 63 and RAM 64, those of which are respectively connected to the bus 50 and compose a main body of a microcomputer. The electronic musical apparatus is further provided with an external storage device 65, communication interface circuit 66 and output interface circuit 67. The external storage device 65 includes various recording mediums such as a hard disk HD that is incorporated beforehand into this electronic musical apparatus, a compact disk CD or flexible disk FD that can be attached to this electronic musical apparatus and drive units corresponding respectively to each recording medium, wherein it can store and read out a large quantity of data and programs. These data and programs are stored beforehand in the hard disk HD, supplied from a compact disk CD or flexible disk FD to the hard disk HD, or supplied from the outside to the hard disk HD via the communication interface circuit 66. In this embodiment, a browser program and reproduction control program shown in FIG. 4 are particularly stored in the hard disk HD. Further, in this specification, attention should be paid for the configuration wherein the RAM 64 is made of a volatile memory and the external storage device 65 is made of a volatile memory.

The communication interface circuit 66 is connected to the network 20. The output interface circuit 67 outputs an MIDI-format data to the outside via an MIDI output terminal 67a. Further, the output interface circuit 67 outputs normal digital data, that includes the generated digital tone signal and does not have an MIDI-format, to the outside via a digital output terminal 67b.

Subsequently, the operation of the embodiment having the aforesaid configuration will be explained. The operation will be explained by using a functional block diagram shown in FIG. 3 that indicates each function of the electronic musical apparatus that is realized by a hard circuit shown in FIG. 2 and a program process. In FIG. 3, a temporal storage portion 64a is a volatile memory area provided in the RAM 63 in FIG. 2. A recording medium 65a corresponds to a non-volatile memory area such as a hard disk HD, compact disk CD, flexible disk FD or the like included in the external storage device 65. A browser portion BR is a function realized when the CPU 21 executes the browser program shown in FIG. 4. The reproduction control portion CT is a function when the CPU 21 executes the reproduction control program shown in FIG. 4. Accordingly, the following explanation is made, supposing that the browser portion BR and the reproduction control portion CT execute the browser program and reproduction control program respectively. It should be noted that the other portions of the electronic musical apparatus of FIG. 3 are same as those of FIG. 2 marked with the same numerals.

When a user operates the input operation element group 41 to start the browser program, the browser portion BR accesses to a distribution page of the content distribution server 30 for requesting the content distribution page data to the content distribution server 30 at Step B11 in FIG. 4. The content distribution server 30 transmits the content distribution page data to the browser portion BR at Step S11 in response to this request. The browser portion BR receives this transmitted content distribution page data and displays the content distribution page indicated by the received content distribution page data on the display device 42 at Step B12. When the user clicks a link displayed in the displayed content distribution page, the browser portion BR requests a reproduction manner specifying file corresponding to this link to the content distribution server 30 at Step B13. Then, the content distribution server 30 transmits the requested reproduction manner specifying file to the browser portion BR in response to this request.

Figure 7:
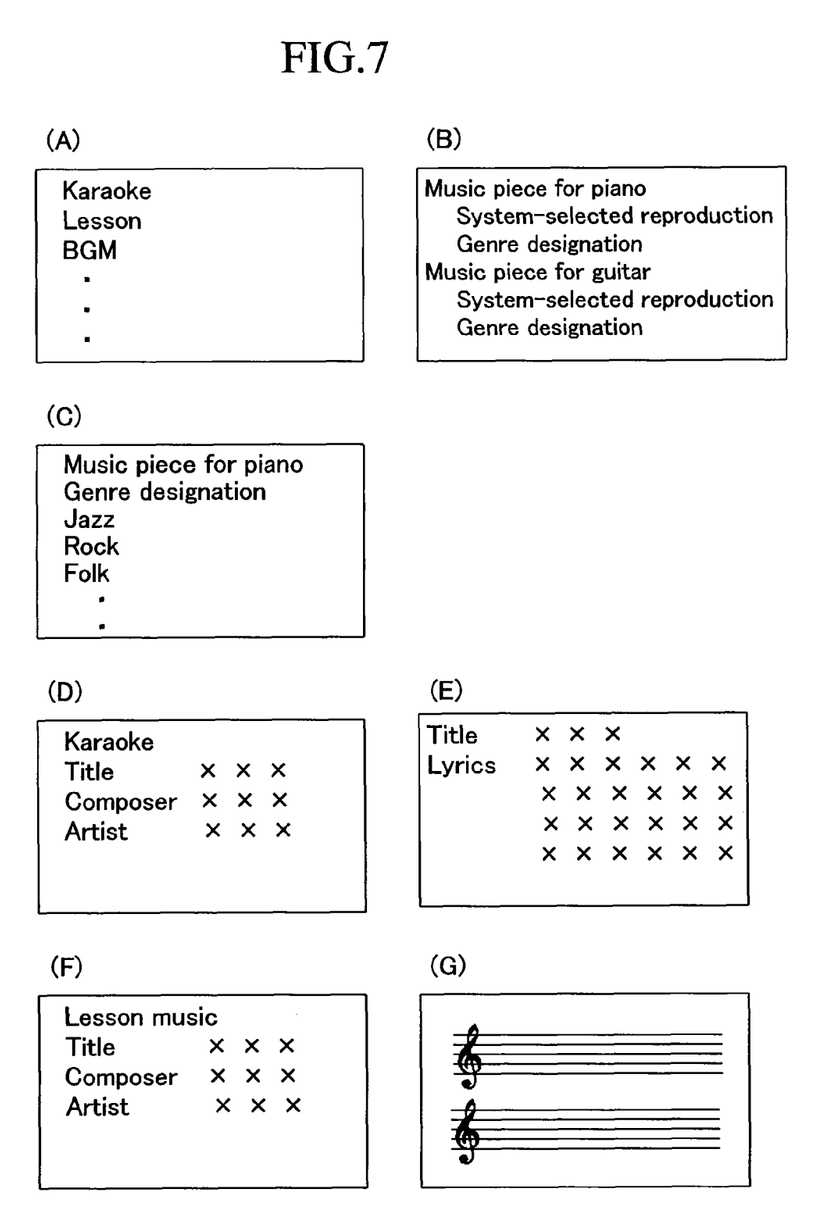
FIGS. 7(A) to (G) are views showing examples of a display screen on a display device.

The operation of the browser portion BR by the time when it receives the reproduction manner specifying file from the content distribution server 30 as described above will be explained by taking a specific example. The content distribution page data transmitted from the content distribution server 30 to the browser portion BR indicates the head page at the beginning, so that this head page is displayed on the display device 42. This head page is a menu wherein items such as karaoke, lesson, BGM, or the like for designating the purpose of use of the music content are listed as shown in FIG. 7(A). When the user operates the input operation element group 41 to select one of the items in the menu, displayed next on the display device 42 is a selection menu from which the user may select "system-selected reproduction" (plural music pieces determined beforehand at the content distribution server 30) or specific genre designation such as jazz, rock, fork or the like, for instrument corresponding music types (for example, music piece for piano, music piece for guitar or the like) that belong to the aforesaid items and are classified for every major musical instruments. When the user selects the "system-selected reproduction" of the desired instrument corresponding music type, the reproduction manner specifying file stored in the content distribution server 30 and corresponding to the "system-selected reproduction" of the selected instrument corresponding music type is transmitted to the browser portion BR.

On the other hand, when the user selects a desired genre designation of the instrument corresponding music type with the display state shown in FIG. 7(B), plural genres such as jazz, rock, fork, or the like belonging to the selected instrument corresponding music type are displayed as illustrated in FIG. 7(C). If the user selects a specific genre, the reproduction manner specifying file, which is stored in the content distribution server 30, belongs to the instrument corresponding music type and corresponds to the selected genre, is transmitted to the browser portion BR.

Figure 5:
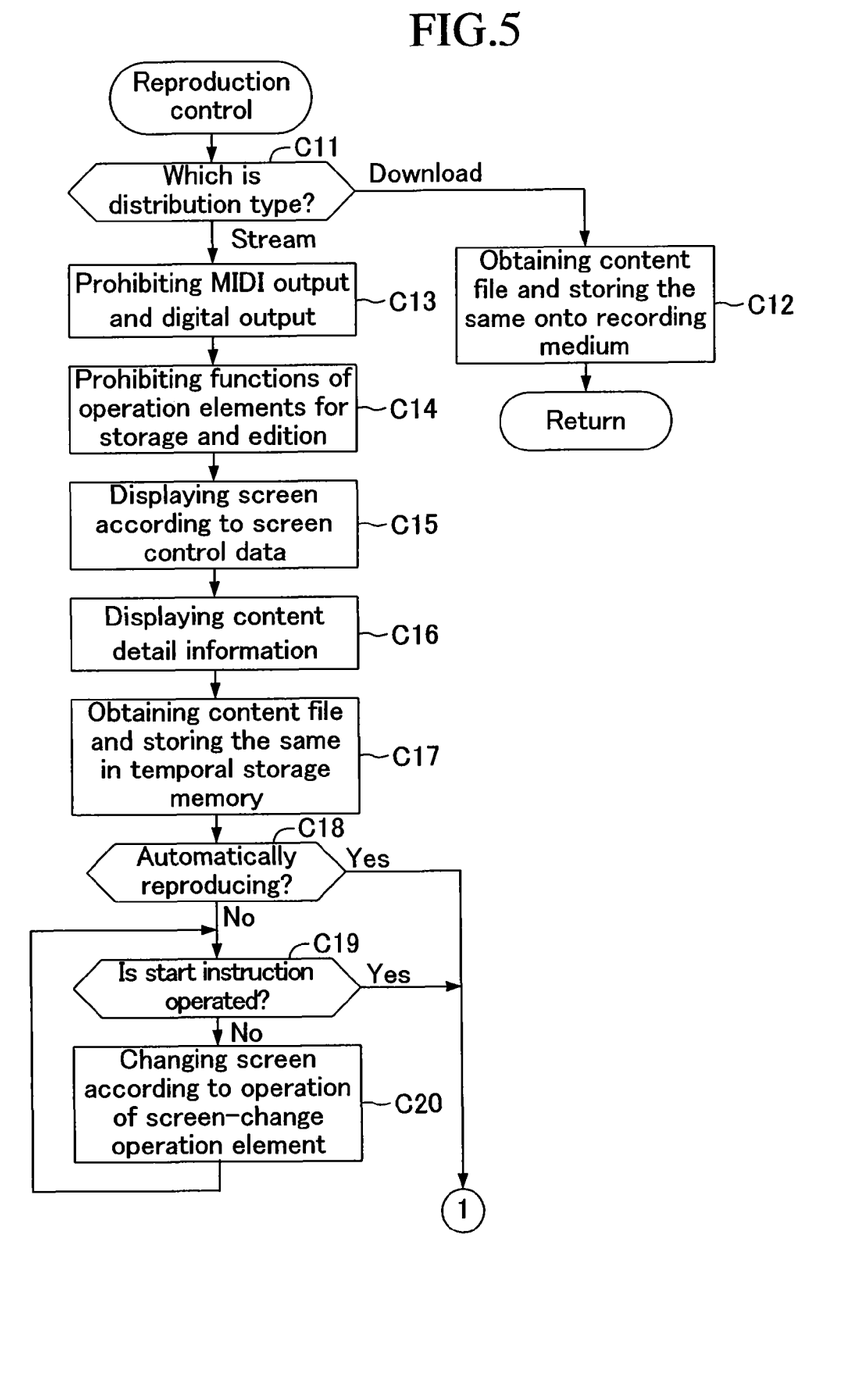
FIG. 5 is a flowchart showing a former half of the reproduction control routine shown in FIG. 4.
Figure 6:
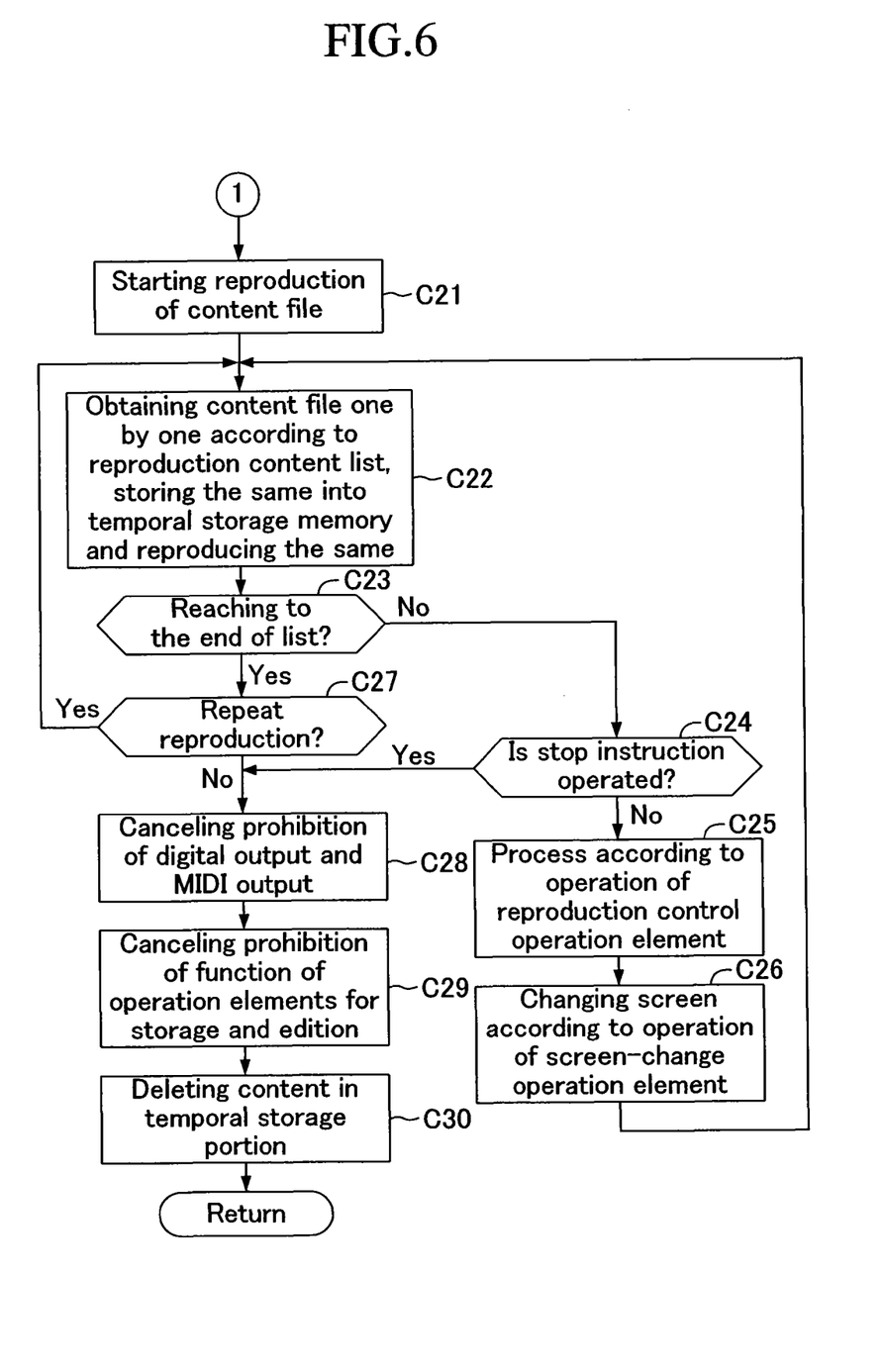
FIG. 6 is a flowchart showing a latter half of the reproduction control routine shown in FIG. 4.

When the specific reproduction manner specifying file is transmitted from the content distribution server 30 to the browser portion BR as described above, the browser portion BR receives the transmitted reproduction manner specifying file and supplies the same to the reproduction control portion CT at Step B14. The reproduction control portion CT executes the process of the reproduction control routine at Step S10 by using the supplied reproduction manner specifying file. In the reproduction control routine, it is determined at Step C11 which one the distribution type data in the supplied reproduction manner specifying file specifies, download or stream, as shown in FIGS. 5 and 6 in detail.

If the download is specified, the reproduction control portion CT obtains, at Step C12, all content files designated by the content URL from the content distribution server by using the reproduction content list (content URL) in the reproduction manner specifying file. Then, it memorizes and stores the obtained all content files in the recording medium 65a. In this case, the distribution server 30 transmits the content file to the reproduction control portion CT by the process at Step S13.

On the other hand, if the distribution type data in the reproduction manner specifying file specifies the stream as the distribution type, the function of the output interface circuit 67 is stopped to prohibit the MIDI data and digital data from being outputted to the outside from the MIDI output terminal 67a and digital output terminal 67b at Step C13. Subsequently, at Step C14, the input function of the operation elements, among the input operation element group 41, that are used for storage and edition of data, is stopped to invalidate the operation of these operation elements. This prohibits the storage to the recording medium 65a, edition or external output of the obtained content file or various data generated based upon the obtained content file as described later, even if the content file is obtained.

After the process as Step C14, the reproduction control portion CT controls the display screen of the display device 42 based upon the screen control data in the reproduction manner specifying file. Specifically, if the screen control data indicates the browser, the browser screen such as shown in FIGS. 7(A) to (C) is displayed. If the screen control data indicates lyrics, the screen is changed to the one for displaying lyrics. If the screen control data indicates a score, the screen is changed to the one for displaying a score. It should be noted that, in the display of lyrics and score, the actual lyrics and score are not displayed, since the actual music content has not yet been obtained.

Subsequently, at Step C16, the reproduction control portion CT controls the display device 42 based upon the content detail information of the head content list data in the reproduction manner specifying file for displaying the content detail information (title, composer, artist, copyright information of the music content) on the display device 42 (see FIGS. 7(D) and 7(F)). After the process at Step C16, the reproduction control portion CT requests, at Step C17, the content file designated by the content URL at the head content list data in the reproduction manner specifying file to the content distribution server 30 by using the same URL. Then, it obtains the content file distributed from the content distribution server 30 and writes the same into the temporal storage portion 64a.

After obtaining the content file, the reproduction control portion CT determines whether the automatic reproduction control data in the reproduction manner specifying file indicates "automatically reproducing" or not at Step C18. If it indicates "automatically reproducing", the program proceeds to a process at Step CT21 shown in FIG. 6. If the automatic reproduction control data does not indicate "automatically reproducing", "NO" determination is made at Step C18, and then, a circulation process made of Step C19 and Step C20 is repeatedly kept on being executed until the user instructs the start by operating the start operation element in the input operation element group 41. During this circulation process, the reproduction control portion CT accepts the operation of a screen-change operation element in the input operation element group 41 by the process at Step C20. In case where the screen-change operating element is operated by the user, the display screen on the display device 42 is changed in accordance with the instruction by the operation of the screen-change operation element. By this operation, the display screen on the display device 42 that displays the content detail information is also changed to the browser screen shown in FIGS. 7(A) to (C), for example. By the process at Step C20, the user freely changes the display screen on the display device 42 specified by the screen control data in the reproduction manner specifying file before the reproduction of the music content. When the start is instructed by the operation on the start operation element during the circulation process made of Steps C19 and C20, "YES" determination is made at Step C19, and then, the program proceeds to the process at Step C21 in FIG. 6.

At Step C21, the music piece is reproduced by using the music content stored at the temporal storage portion 64*a*, whereby a circulation process made of Steps C22 to C26 starts to be repeatedly executed. The music piece data included in the music content stored in the temporal storage portion 64*a* is successively outputted to the tone generating circuit 43 in accordance with the progression of the music piece during this circulation process. The tone generating circuit 43 successively generates a tone signal so as to correspond to the music piece data and sounds out the generated tone signal via the sound system 64, whereby the music piece by the music piece data included in the music content is reproduced. Further, so long as the screen change is not instructed by the process at Step C20, the display screen on the display device 42 is changed from the content detail information (title, composer, artist, copyright information of the music content) to the screen display set by the process at Step C15, with the reproduction of the music piece. For example, in case where the screen control data indicates lyrics, the display screen on the display device 42 is changed from the content detail information shown in FIG. 7(D) to the display of lyrics shown in FIG. 7(E). Further, in case where the screen control data indicates a score, the display screen on the display device 42 is changed from the content detail information shown in FIG. 7(F) to the display of score shown in FIG. 7(G). However, in case where the screen change is instructed by the process at Step C20, the display screen on the display device 42 becomes in accordance with the instruction at Step C20.

When the reproduction of one music piece in the music content designated by the reproduction content list data in the reproduction manner specifying file is ended during the circulation process made of Steps C22 to C26, the content URL of the next content list data in the supplied reproduction manner specifying file is used to obtain the content file designated by the same URL from the content distribution server 30, whereby the previous content file stored at the temporal storage portion 64*a* is deleted and a newly obtained content file is written in the temporal storage portion 64*a*, by the process at Step C22. In this case too, the content distribution server 30 transmits the content file to the reproduction control portion CT by the process at Step S13 in FIG. 4. Then, the music piece in the newly obtained content file is reproduced, and simultaneously, lyrics or score is displayed on the display device 42 as described above.

During the circulation process, it is determined whether the reproduction of the music content designated by the reproduction content list in the reproduction manner specifying file reaches to the end or not at Step C23. If the reproduction of the music content does not reach to the end, it is determined at Step C24 whether a user instructs a stop by the operation on the stop operation element in the input operation element group 41. If the user does not instruct the stop, the reproduction manner of the music content is controlled in accordance with the operation on the reproduction control operation element such as pause, restart, fast-forward or rewind in the input operation element group 41 at Step C25. At Step C26, the operation on the screen-change operation element in the input operation element group 41 is accepted, and in case where the screen-change operation element is operated by the user, the display screen on the display device 42 is changed in accordance with the instruction by the operation on the screen-change operation element, like the process at Step C20. By the process at Step C26, the user can freely change the display screen on the display device 42 specified by the screen control data in the reproduction manner specifying file during the reproduction of the music content.

When the reproduction of the music content designated by the reproduction content list in the reproduction manner specifying file reaches to the end during the circulation process, "YES" determination is made at Step C23, and then, the program proceeds to the process at Step C27. It is determined at Step C27 whether the repeat reproduction control data in the reproduction manner specifying file indicates "repeating" or not. If it indicates "repeating", the circulation process made of Steps C22 to C26 is again executed. If it does not indicate "repeating", "NO" determination is made at Step C27, and then, the program proceeds to processes at Steps C28 to C30. When the user instructs a stop by operating the stop operation element in the input operation element group 41 during the circulation process made of Steps C22 to C26, "YES" determination is made at Step C24, and the program proceeds to the processes at Steps C28 to C30.

At Step C28, the function of the output interface circuit 67 is returned to cancel the prohibition of output of the MIDI data and digital data to the outside from the MIDI output terminal 67*a* and digital output terminal 67*b*. At Step C29, the input function of the operation elements, that are used for storage and edition of the data, among the input operation element group 41 is returned to cancel the invalidity of the operation on these operation elements. At Step C30, the music content stored in the temporal storage portion 64*a* is deleted, and the execution of this reproduction control routine is ended.

As for the content file downloaded to the recording medium 65*a* by the process at Step C13, the content file is transferred to the temporal storage portion 64*a*, whereby the music content can be reproduced by the separately prepared reproduction program made of the processes at Steps C18 to C26. In this case, the output interface circuit 67 functions, wherein the music content is outputted to the outside via the MIDI output terminal 67*a* and the digital data indicating the reproduced sound can be outputted to the outside via the digital output terminal 67*b*. Further, the execution of the separately prepared program by the user allows the user to read out the content file stored in the recording medium 65a at any time and freely use the same, and further to edit the music content. It is also possible to newly store the content file, that has been subject to the edition, and to output the same to the outside.

The present invention is not limited to the aforesaid embodiment, and various modifications are possible without departing from the spirit of the present invention.

For example, although the aforesaid embodiment has provided thereto both the MIDI output terminal 67a and digital output terminal 67b, only one of them may be provided. Further, the electronic musical apparatus may have only one of the editing function and storage function. Moreover, the electronic musical apparatus may have only one of the lyrics display function and score display function.

The aforesaid embodiment has provided thereto screen control data that is shared by plural content files in the reproduction manner specifying file. However, instead of this, screen control data indicating a display screen of browser, lyrics or score may be provided for every content file designated by the reproduction content list data. This makes it possible to realize the content distribution service with various reproduction manners, such as, with respect to the same music piece, a user only listens to a reproduced music at the browser display screen at the beginning, then, practices singing a song with the lyrics display screen, and finally practices playing a musical instrument with the score display screen. In this case, the screen control data may be included in the reproduction content list. Further, the screen control data may be included in the content file as a system exclusive message.

What is claimed is:

1. An electronic musical apparatus comprising:
    a receiving portion configured to receive screen control data for a plurality of music contents from a content distribution server, the screen control data indicating at least one screen type shared by the plurality of music contents;
    a controller configured to receive a selected music content from the content distribution server and display the selected music content based on the received screen control data, to display the selected music content in accordance with a selected one screen type among the at least one screen type on a display device;
    a reproducing portion that reproduces a music piece corresponding to the selected music content; and
    a changing portion that changes the displayed screen from the selected one screen type to another screen type.

2. An electronic musical apparatus according to claim 1, wherein the at least one screen type includes a plurality screen types including a browser screen, a lyric screen, and a score screen.

3. An electronic musical apparatus according to claim 2, further including an input operational unit operable by a user, wherein the changing portion changes the displayed screen to the another screen type in accordance with screen-change operation selected by a user with the input operational unit.

4. An electronic musical apparatus according to claim 2, wherein the changing portion changes the displayed screen to the another screen type before the music piece is reproduced by the reproducing portion.

5. An electronic musical apparatus according to claim 2, wherein the changing portion changes the displayed screen to the another screen type while the music piece is being reproduced by the reproducing portion.

6. A computer-readable medium storing a computer program executable by an electronic musical apparatus, the computer program comprising:
    a receiving instruction configured to receive screen control data for a plurality of music contents from a content distribution server via a receiving portion of the electronic musical apparatus, the screen control data indicating at least one screen type shared by the plurality of music contents;
    a display control instruction configured to receive a selected music content from the content distribution server and display the selected music content based on the received screen control data, to display the selected music content in accordance with a selected one screen type among the at least one screen type on a display device;
    a reproducing instruction configured to reproduce a music piece corresponding to the selected music content; and
    a changing instruction configured to change the displayed screen from the selected one screen tyre to another screen type.

7. A method of displaying a plurality of music contents on a display device for an electronic musical apparatus, the method comprising:
    a receiving step of receiving screen control data for a plurality of music contents from a content distribution server via a receiving portion of the electronic musical apparatus, the screen control data indicating at least one screen type shared by the plurality of music contents;
    a display control step of receiving a selected music content from the content distribution server and displaying the selected music content based on the received screen control data, to display the selected music content in accordance with a selected one screen type among the at least one screen type on the display device;
    a reproducing step of reproducing a music piece corresponding to the selected music content; and
    a changing step of changing the displayed screen from the selected one screen type to another screen type.

* * * * *